United States Patent Office 3,240,606
Patented Mar. 15, 1966

3,240,606
METHOD OF PRODUCING A GERMINATED
WHEAT FOOD
Allen E. Bond, 203 Wibaux St., Brockway, Mont.
No Drawing. Filed May 3, 1962, Ser. No. 192,058
6 Claims. (Cl. 99—80)

This invention relates to a method of preparing a ready-to-eat product for human consumption, and particularly relates to such products manufactured from kernels of wheat.

A principal objective of this invention is to provide a high protein, low calorie food, having a novel and very pleasing taste, and which can specifically be utilized as a between meal snack, or cocktail food.

A further objective of the present invention is to provide an inexpensive food product which will contribute to a balanced diet by taking advantage of the characteristics of a most plentiful grain.

A still further objective of the invention is to provide an improved wheat product requiring treatment of the wheat only with water, heated oil, and a flavoring substance.

Another important objective of the invention is to provide a food product made from kernels of wheat which is uniquely adapted for use with coating candies of various sorts—such as a substitute for nuts in chocolates, brittles, and other hard candies.

A still further objective of the invention is to provide an edible wheat kernel which has been expanded approximately three times its normal size through the processes of soaking, germinating, and deep fat frying.

Still further objects and advantages will appear from the more detailed description set forth below, it being understood, however, that this more detailed description is given by way of illustration and explanation only, and not by way of limitation, since various changes therein may made by those skilled in the art without departing from the scope and spirit of the present invention. Going now into the details of the process, to illustrate, but not to limit the invention:

(1) In accomplishing the above objectives, suitable quantities of high protein wheat kernels are selected after the product is screened in order to obtain only the larger whole kernel grains from the mass. Preferably, the wheat used should be of a first quality, high protein type;

(2) The selected grain is thoroughly cleaned and washed by submitting it to agitation, vacuum sources, water sprays, or other cleaning methods well known to the art;

(3) After cleaning, the selected grain is placed along the bottom of flat soaking trays in substantially a single layer of approximately three or four inches, and covered with pure water. The water, preferably of high mineral content, is added until a level several inches above the grain is reached. The grain is permitted to soak for approximately 48 hours. The water temperature during soaking is maintained at a temperature of 60°–70° F., and the kernels are periodically agitated to assure uniformity of moisture absorption. As an alternative, cool water (from 40°–60° F.) may be used, but a longer period of soaking is required. The water used for soaking is changed every two or three hours to maintain the tray or vat temperatures constant. In no event, however, should the temperature exceed 105° F. because this will hinder the normal germination process. It is during the soaking process that germination commences, and therefore, the relationship between soaking time and temperature is primarily dependent on the extent of germination desired at this stage of the process.

(4) The water is drained from the trays and the grain is subjected to normal room temperature and humidity, where germination continues. The kernels are allowed to germinate until the radical and plumule each protrude or sprout through the pericarp or hull, approximately, but not to exceed 1/16 of an inch. At this stage the kernels are approximately double their original untreated size and tender.

(5) Water at approximately 110° F. is placed into the trays and the kernels are again permitted to soak for a period of approximately two hours. The elevated temperature stops the germination process and the grain is ready for further processing. Care must be taken during this step to insure that the grain will not develop temperatures in excess of approximately 135° F. At such temperatures the grain will sour in a very short period of time.

(6) After the two hour period, the water is again drained from the vat, and the germinated grain is dried by submitting it to forced dry air, blotting or other suitable fast-dry methods.

(7) The dried grain is then placed into a vegetable oil or the like, having temperatures between 400° and 450° F. for approximately 45 seconds. During this cooking, or roasting the kernel further expands and the pericarp of the individual grains will split along one side of their longitudinal lengths. The grain is removed from the oil, and the excess oil is removed by centrifugal force, or other oil absorption and removal methods which are well known in the food preparation arts.

The product is now in suitable condition to receive flavoring of various sorts. It will have a nut-like flavor and may be salted and packaged in hermetically sealed containers as a snack. The product is also well adapted for a substitute for nuts in chocolate candies or for the peanuts in the various brittles and hard candies known to the art. The product is susceptible to a wide range of flavors and can be treated most delectably with onion, garlic, and celery salts.

In a general manner, while there has been disclosed in the above description, what is deemed to be a most practical and efficient process, it should be well understood that the invention is not limited to the specific steps described, as there might be changes made without departing from the principle of the present invention as comprehended within the scope of the accompanying claims.

I claim:

1. A process for converting a wheat kernel into a ready-to-eat product comprising the steps of submitting the kernels to germinating conditions until sprouting begins, subjecting the kernels to temperatures sufficient to stop germination, drying said kernals and heat-treating the resulting product in cooking oils at near boiling temperature until the pericarps of said kernels split.

2. A process for converting wheat kernels into a ready-to-eat product comprising the steps of soaking the kernels in water until germination commences, draining the water from said kernels and permitting germination to continue until the radicals and plumules protrude approximately 1/16 of an inch, retarding germination and heat-treating said kernels in cooking oil at near boiling temperature.

3. A process for converting wheat kernels into a ready-to-eat product comprising the steps of soaking the kernels in water until germination commences, draining the water from said kernels and permitting germination to continue at atmospheric conditions until their radicals and plumules protrude approximately 1/16 of an inch, fast-drying said kernels, and heat-treating said kernels in cooking oils having a temperature in excess of 400° F.

4. A process for converting wheat kernels into a ready-to-eat product comprising the steps of soaking the kernels in water changed at intervals to maintain substantially constant germination conducive temperature until germination commences, draining the water from said kernels and permitting germination to continue at atmospheric conditions until their radicals and plumules protrude approximately 1/16 of an inch, stopping germination by subjecting said kernels to water having a temperature of approximately 110° F., fast-drying said kernels, and heat-treating said kernels in cooking oils having a temperature in excess of 400° F.

5. A process for converting wheat kernels into a ready-to-eat product comprising the steps of soaking the kernels in water changed at intervals to maintain substantially constant temperature until germination commences, draining the water from said kernels and permitting germination to continue at temperature atmospheric conditions until their radicals and plumules protrude approximately 1/16 of an inch, fast-drying said kernels, heat-treating said kernels in cooking oil at 400°–450° F., and adding flavoring salts to the resulting product.

6. A process for converting wheat into a ready-to-eat product comprising the steps of screening a selected amount of wheat for the largest kernels, soaking said kernels in water at approximately 60°–70° F. for 48 hours, draining the water from said kernels and permitting germination to continue for approximately 2 hours, stopping germination by soaking said kernels in water having a temperature of approximately 100° F., drying said kernels and heat-treating said kernels in cooking oil at near boiling temperature.

References Cited by the Examiner

UNITED STATES PATENTS

| | | | |
|---|---|---|---|
| 1,097,882 | 5/1914 | Saunders et al. | 99—80 |
| 2,627,464 | 2/1953 | Kehetian | 99—27 X |
| 2,960,409 | 11/1960 | Macey et al. | 99—53 X |

FOREIGN PATENTS 327,811   4/1930   Great Britain.

A. LOUIS MONACELL, *Primary Examiner.*

BEATRICE H. STRIZAK, *Examiner.*